(12) United States Patent
Baker et al.

(10) Patent No.: US 8,807,419 B2
(45) Date of Patent: *Aug. 19, 2014

(54) METHOD AND SYSTEM FOR CREATING AND DELIVERING GROUP MESSAGES

(76) Inventors: Lynlee Caron Baker, Oakton, VA (US); Elizabeth Thomas Dold, Fairfax, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/830,228

(22) Filed: Jul. 2, 2010

(65) Prior Publication Data

US 2010/0264207 A1 Oct. 21, 2010

Related U.S. Application Data

(63) Continuation of application No. 11/367,796, filed on Mar. 2, 2006, now Pat. No. 7,770,788.

(60) Provisional application No. 60/657,872, filed on Mar. 3, 2005, provisional application No. 60/733,773, filed on Nov. 7, 2005.

(51) Int. Cl.
*G06F 17/00* (2006.01)
*G06K 5/00* (2006.01)
*G06F 15/16* (2006.01)

(52) U.S. Cl.
USPC .......................... 235/375; 235/380; 709/204

(58) Field of Classification Search
CPC .. G06Q 10/10; G06Q 10/101; G06Q 30/0236
USPC ............ 235/380, 383, 381, 375, 379; 705/26, 705/36 R, 64, 1, 21; 709/204
See application file for complete search history.

(56) References Cited

U.S. PATENT DOCUMENTS

| | | | |
|---|---|---|---|
| 4,597,099 A | 6/1986 | Sawafuji | |
| 5,115,472 A | 5/1992 | Park et al. | |
| 5,426,594 A | 6/1995 | Wright et al. | |
| 5,442,567 A | 8/1995 | Small | |
| 5,513,117 A | 4/1996 | Small | |
| 5,787,151 A | 7/1998 | Nakatsu et al. | |
| 5,870,718 A | 2/1999 | Spector | |
| 5,954,369 A | 9/1999 | Seabrook | |
| 5,993,048 A | 11/1999 | Banks et al. | |
| 6,295,058 B1 | 9/2001 | Hsu et al. | |
| 6,507,865 B1 * | 1/2003 | Hanson et al. | 705/36 R |
| 6,804,806 B1 | 10/2004 | Bansal et al. | |
| 7,770,788 B2 | 8/2010 | Baker et al. | |
| 2002/0042775 A1 | 4/2002 | Nelson et al. | |
| 2002/0052756 A1 * | 5/2002 | Lomangino | 705/1 |

(Continued)

OTHER PUBLICATIONS

Office Action for U.S. Appl. No. 11/367,796, mailed Jun. 25, 2009.

(Continued)

*Primary Examiner* — Thien T Mai

(57) ABSTRACT

A method and system for managing the creation and delivery of an electronic group message is disclosed. The electronic group message can be provided to two or more (i.e., a group) of signers to sign the electronic group message. Once signed, the electronic group message can be provided to one or more recipients. Alternatively, the electronic group message can be provided from a signer to a plurality of recipients, where different recipients receive different messages. One type of electronic group message is an electronic card known as a care card.

20 Claims, 11 Drawing Sheets

(56) References Cited

U.S. PATENT DOCUMENTS

| | | |
|---|---|---|
| 2002/0087427 A1 | 7/2002 | Ganesan et al. |
| 2002/0103763 A1* | 8/2002 | Schutz .................. 705/64 |
| 2002/0138363 A1 | 9/2002 | Karas et al. |
| 2002/0138573 A1* | 9/2002 | Saguy .................. 709/204 |
| 2003/0004997 A1 | 1/2003 | Parker et al. |
| 2003/0074266 A1 | 4/2003 | Lorber |
| 2003/0130907 A1* | 7/2003 | Karas et al. ............ 705/26 |
| 2003/0150142 A1 | 8/2003 | Street |
| 2003/0208556 A1 | 11/2003 | Friedman et al. |
| 2003/0217488 A1 | 11/2003 | Chmiel et al. |
| 2003/0224852 A1 | 12/2003 | Walker et al. |
| 2004/0006510 A1 | 1/2004 | Lertzman et al. |
| 2004/0030657 A1 | 2/2004 | Holm-Blagg et al. |
| 2004/0193539 A1 | 9/2004 | Sullivan |
| 2004/0205138 A1 | 10/2004 | Friedman et al. |
| 2005/0092826 A1 | 5/2005 | Blackman |
| 2005/0154675 A1 | 7/2005 | Johnson, Jr. |
| 2005/0216354 A1 | 9/2005 | Bam et al. |
| 2005/0242570 A1 | 11/2005 | Gecha et al. |
| 2005/0261968 A1 | 11/2005 | Randall et al. |
| 2006/0085252 A1 | 4/2006 | Kersenbrock |
| 2006/0091223 A1 | 5/2006 | Zellner et al. |
| 2007/0038716 A1 | 2/2007 | Saguy |

OTHER PUBLICATIONS

Final Office Action for U.S. Appl. No. 11/367,796, mailed Mar. 19, 2010.

Notice of Allowance for U.S. Appl. No. 11/367,796, mailed Jun. 2, 2010.

"E-Cards: E-Cards: Write Your Card", www.e-cards.com/send/write-cards.pl, downloaded—Jul. 17, 2005, 1-5 pgs.

"Halmark/E-Cards", www.hallmark.com, downloaded Jul. 17, 2005, 1-5 pgs.

* cited by examiner

METHOD AND SYSTEM FOR CREATING AND DELIVERING GROUP MESSAGES

CROSS-REFERENCE TO RELATED APPLICATIONS

This application is a continuation of U.S. patent application Ser. No. 11/367,796, filed Mar. 2, 2006, now U.S. Pat. No. 7,770,788 and entitled "METHOD AND APPARATUS FOR CREATING AND DELIVERING GROUP MESSAGES," which is hereby incorporated by reference herein, and which in turn claims the benefit of priority from (i) U.S. Provisional Patent Application No. 60/657,872, filed Mar. 3, 2005, and entitled "METHOD AND APPARATUS FOR FACILITATING CHARITABLE DONATIONS," which is hereby incorporated by reference herein; and (ii) U.S. Provisional Patent Application No. 60/733,773, filed Nov. 7, 2005, and entitled "METHOD AND SYSTEM FOR CREATING AND DELIVERING GROUP MESSAGES," which is hereby incorporated by reference herein.

BACKGROUND OF THE INVENTION

1. Field of the Invention

The invention relates to electronic messaging and, more particularly, to electronic messaging by a group of participants.

2. Description of the Related Art

Group messaging is an invaluable communication tool. With group messaging, it is important for certain messages to be private in order to truly be a meaningful communication. For example, when a co-worker is retiring, one of the workers purchases a paper card and it gets passed throughout the office. The other workers in the office can sign the card and possibly handwrite a brief message. Any messages that are provided are available for the other co-workers to read. Hence, everyone tends to write the same sort of message—not getting too personal—because as the card is passed the other co-workers can (and often do) read the other messages. This largely diminishes the communication. More recently, electronic cards have become available. A person can access a website sponsoring electronic card, select a particular card and provide a message. Unfortunately, however, electronic cards (e.g., e-cards, e-mails) only permit a single sender to send an identical message to one or more recipients. An electronic card is also not able to be signed by multiple parties, nor can it contain private messages.

A gift can be provided with a physical card or an electronic card. However, those sending an electronic card do not conventionally have the ability to participate in a group gift or a charitable contribution. As a result, gifts and contributions become more difficult and time consuming which limits the amount of gifts or contributions that would otherwise be made.

Accordingly, conventional approaches to group messaging and gift or charitable giving is limited, which is a disservice to all parties involved. Thus, there is a need for improved approaches to provide group messages.

SUMMARY OF THE INVENTION

Generally speaking, the invention pertains to a method and system for managing the creation and delivery of an electronic group message. The electronic group message can be provided to two or more (i.e., a group) of signers to sign the electronic group message. Once signed, the electronic group message can be provided to one or more recipients. Alternatively, the electronic group message can be provided from a signer to a plurality of recipients, where different recipients receive different messages.

One aspect of the invention relates to the ability for a group message to include both private and public messages. The messages can include text, images, voice and/or video. The ability to provide private messages to a recipient makes participation in the group message more personal.

Another aspect of the invention is that gifts, including donations, can be facilitated and associated with a group message card. Signers to the group message card can contribute to a joint gift. Alternatively, signers can opt to provide an individual gift and the system can provide links to such web sites of interest. Furthermore, the group message card can describe (i) the gift(s) being provided by one or a group of signers, and/or (ii) the contributors to such gift(s). The payment for the gift can be provided in a variety of ways. Examples of payment methods include credit card, debit card, Internet service (e.g., PayPal), wire transfer, automatic withdraw, electronic check, or payroll deduction. In the case in which the group message card is sponsored by a business entity, if the signer works at that entity, the payment for the gift can be provided by payroll deduction. One particular kind of gift that can be particularly facilitated in one embodiment is a donation to a charitable organization. The donation can be made on behalf of the recipient or another person or entity associated with the recipient. To document the donation for tax deduction purposes, the system can provide an electronic receipt for the donation, which can be kept, printed and saved.

Still another aspect of the invention is that, on signing or providing a message for a group message card, signers can participate in the design and/or placement of their message/signature on the group message card. A signer's message can include multimedia components (e.g., audio, music, photo, video, voice, slideshow, etc.) and can also include one or more selectable symbols, jokes, or phrases. For example, a signer can specify orientation, placement, size, font, color, style, graphics, etc. to be utilized with their message and/or signature.

Still another aspect of the invention pertains to the delivery of a group message card. The group message card can be performed in an electronic manner, such as using a recipient's electronic mail address. In such case, the group message card can be provided in the body of electronic mail, which is preferably a mark-up language (e.g., HTML, XML) page. Alternatively, the group message card can be provided as an attachment to an electronic mail. In still another alternative, the electronic mail message can include a link to a web page that contains the group message card. Regardless of the particulars on how the group message is acquired by the recipient, the group message can include multimedia components, if desired. Preferably, the group message is an electronic message having text, graphics and possibly multimedia components (e.g., audio, music, photo, video, voice, slideshow, etc.). The electronic delivery of the group message allows for ease of delivery in a cost-effective manner. However, alternatively or additionally, the group message can be provided to the recipient as a printed card. For example, the printed card can be delivered electronically via a print option or physically via a postal mail option, or both. The printed card can be printed based on the content provided by an initiator and signers.

One type of group message is a card, such a card can be referred to as a group message card. Normally, the group message is electronic. Hence, when the group message is presented as a card, the card is typically an electronic card.

The invention can be implemented in numerous ways, including as a method, system, device, apparatus (including graphical user interface), or computer readable medium. Several embodiments of the invention are discussed below.

As a method for providing a card to a recipient, one embodiment can include at least the acts of: creating an initial electronic card destined for a recipient; identifying a plurality of potential signers of the electronic card; transmitting the electronic card to each of the potential signers; receiving personal messages for the electronic card from a plurality of the potential signers; determining whether any of the plurality of the potential signers have provided a gift for the recipient, the gift being a donation to one or more charitable organization; modifying the electronic card to include the personal messages; providing the modified electronic card, or a printed version thereof, to the recipient; and providing a donation receipt to the signers that have made a donation.

As a computer-implemented method for providing a group message card to at least one recipient, one embodiment can include at least the acts of: receiving card initiation information for the group message card; requesting messages from each of a plurality of participants; receiving a public message and a private message from each of a set of recipients from the plurality of participants; consolidating the public messages and the private messages from the set of participants to form a group message card; sending the group message card to the at least one recipient, the group message card sent to the at least one recipient includes the public messages and the private messages; and permitting the set of participants to view the public messages of the group message card but not the private messages of at least the other of the participants.

As a server machine for providing an electronic card to a recipient, one embodiment can include at least a memory for storing at least computer program code, and a processor configured to execute the computer program code stored in the memory. The computer program code stored in the memory can include at least: computer program code for creating an initial electronic card destined for a recipient; computer program code for identifying a plurality of potential signers of the electronic card; computer program code for transmitting the electronic card to each of the potential signers; computer program code for receiving personal messages for the electronic card from a plurality of the potential signers; computer program code for determining whether any of the plurality of the potential signers have provided a gift for the recipient, the gift being a donation to one or more charitable organization; computer program code for modifying the electronic card to include the personal messages; computer program code for providing the modified electronic card, or a printed version thereof, to the recipient; and computer program code for providing a donation receipt to the signers that have made a donation.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
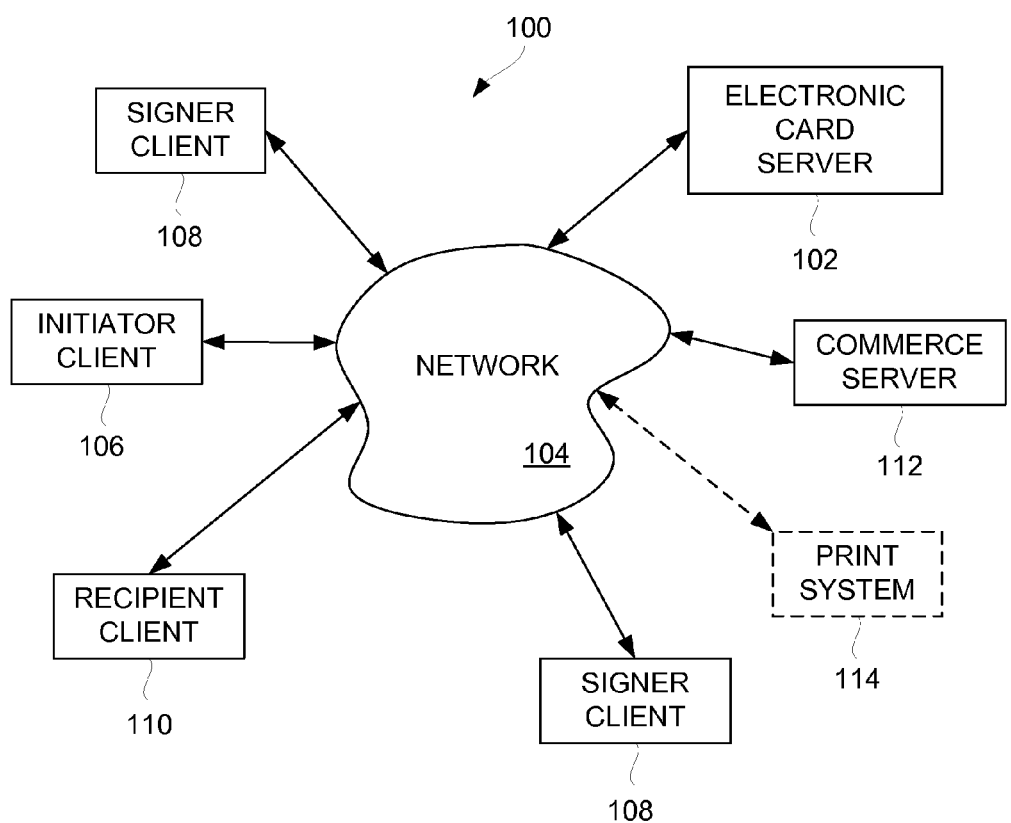
FIG. 1 is a block diagram of an electronic card system according to one embodiment of the invention.

The invention pertains to a method and system for managing the creation and delivery of an electronic group message. The electronic group message can be provided to two or more (i.e., a group) of signers to sign the electronic group message. Once signed, the electronic group message can be provided to one or more recipients. Alternatively, the electronic group message can be provided from a signer to a plurality of recipients, where different recipients receive different messages.

One aspect of the invention relates to the ability for a group message to include both private and public messages. The messages can include text, images, voice and/or video. The ability to provide private messages to a recipient makes participation in the group message more personal.

Another aspect of the invention is that gifts, including donations, can be facilitated and associated with a group message card. Signers to the group message card can contribute to a joint gift. Alternatively, signers can opt to provide an individual gift and the system can provide links to such web sites of interest. Furthermore, the group message card can describe (i) the gift(s) being provided by one or a group of signers, and/or (ii) the contributors to such gift(s). The payment for the gift can be provided in a variety of ways. Examples of payment methods include credit card, debit card, Internet service (e.g., PayPal), wire transfer, automatic withdraw, electronic check, or payroll deduction. In the case in which the group message card is sponsored by a business entity, if the signer works at that entity, the payment for the gift can be provided by payroll deduction. One particular kind of gift that can be particularly facilitated in one embodiment is a donation to a charitable organization. The donation can be made on behalf of the recipient or another person or entity associated with the recipient. To document the donation for tax deduction purposes, the system can provide an electronic receipt for the donation, which can be kept, printed and saved.

Still another aspect of the invention is that, on signing or providing a message for a group message card, signers can participate in the design and/or placement of their message/signature on the group message card. A signer's message can include multimedia components (e.g., audio, music, photo, video, voice, slideshow, etc.) and can also include one or more selectable symbols, jokes, or phrases. For example, a signer can specify orientation, placement, size, font, color, style, graphics, etc. to be utilized with their message and/or signature.

Still another aspect of the invention pertains to the delivery of a group message card. The group message card can be performed in an electronic manner, such as using a recipient's electronic mail address. In such case, the group message card can be provided in the body of electronic mail, which is preferably a mark-up language (e.g., HTML, XML) page. Alternatively, the group message card can be provided as an attachment to an electronic mail. In still another alternative, the electronic mail message can include a link to a web page that contains the group message card. Regardless of the particulars on how the group message is acquired by the recipient, the group message can include multimedia components, if desired. Preferably, the group message is an electronic message having text, graphics and possibly multimedia components (e.g., audio, music, photo, video, voice, slideshow, hyperlink (website link), etc.). The group message can also be easily created by providing users with selectable, predetermined components which can be included in the group message, such as one or more selectable symbols, images, narrations, jokes, or phrases. In one example, a voice component for a message can be recorded by a user via a personal computer. The electronic delivery of the group message allows for ease of delivery in a cost-effective manner. However, alternatively or additionally, the group message can be provided to the recipient as a printed card. For example, the printed card can be delivered electronically via a print option or physically via a postal mail option, or both. The printed card can be printed based on the content provided by an initiator and signers.

A group message process can be initiated by an initiator. An initiator is an individual or any entity that interacts with a group message server to create a base message for a group message card as well as to provide information on potential signers and one or more recipients. More particularly, the initiator provides information concerning the one or more recipients, such as a name, an electronic mail address, etc. The initiator also provides selections for the group message. For example, when the group message is a group message card, the selections can pertain to an occasion, style, color, image, etc. The selections can also vary depending upon sponsorship for the electronic group card, if any. For example, the group message card can be sponsored by a charity (non-profit organization), for-profit organization, employer, etc.

The initiator can provide information on potential signers, such as names and electronic mail addresses. The initiator can also provide a base message for the group message card. In one embodiment, the base message for the group message card can be predetermined. For example, on selection of an occasion for the group message card, the base message can be predetermined. In another embodiment, the base message can be selected from a plurality of available base messages (e.g., predetermined base messages). In still another embodiment, the initiator can provide a custom base message to the system. The system can operate to remind those of the potential signers that have not yet signed to participate. The group message card being formed may also have a deadline for sending the card to the recipient and the potential signers can be reminded of this pending deadline. The initiator can also arrange for inducements to motivate potential signers to participate in the group message card. Examples of inducements include a coupon, a free gift, and a matching contribution. The system can provide the inducement with the original message to the potential signers or in subsequent reminders to the potential signers.

The initiator can also control the manner by which a gift option is permitted. For example, the initiator can permit or prevent a group gift. The initiator can also permit or prevent individual gifts apart from the group gift. The initiator can also urge or encourage donations to a charity (e.g., by a matching program), either as part of gift (individual or group gift) or apart from the gift. Still further, the initiator can control the extent to which information is permitted on a group message card concerning group gifts or individual gifts.

Although the initiator initially sets up the group message card, in one embodiment, any of the potential signers might further be permitted to propose or add a group gift and permit others to contribute. In another embodiment, any of the potential signers might also be permitted to an additional potential signers to the group message card.

One type of group message is a card, such a card can be referred to as a group message card. Normally, the group message is electronic. Hence, when the group message is presented as a card, the card is typically an electronic card.

Embodiments of various aspects of the invention are discussed below with reference to FIGS. 1-8. However, those skilled in the art will readily appreciate that the detailed description given herein with respect to these figures is for explanatory purposes as the invention extends beyond these limited embodiments.

FIG. 1 is a block diagram of an electronic card system 100 according to one embodiment of the invention. The electronic card system 100 facilitates the creation, completion and delivery of electronic cards. The electronic card can, for example, be associated with a particular event. For example, the electronic card can be a welcome card, wedding card, anniversary card, birthday card, retirement card, goodbye card, sympathy card, get well card, thank you card, invitation card, etc. In general, these different types of electronic cards can be referred to as care cards. More generally, the electronic card can be considered an electronic group message.

The electronic card system 100 includes an electronic card server 102. The electronic card server 102 manages the creation, completion and delivery of the electronic cards for the electronic card system. The electronic card server 102 is coupled to a network 104. The network 104, for example, is a data network. The network 104 can pertain to a local area network, a wide area network, and/or a global network (e.g., the Internet).

The electronic card system 100 also includes an initiator client 106, signer clients 108, and at least one recipient client 110. The electronic card system 100 can also include a commerce server 100 that can couple to the network 104. A user of the initiator client 106, known as an initiator, interacts with the electronic card server 102 via the initiator client 106 and the network 104. The initiator initiates an electronic card for a particular recipient associated with the recipient client 110. In this regard, the initiator can select the type of electronic card, can specify signers that are to be invited to participate in signing the electronic card, can provide a base message for the electronic card, and can specify the particular recipient to receive the electronic card. Still further, the initiator can also set timing criteria, such as when the electronic card is to be delivered to the particular recipient.

After initiator has initiated the electronic card with the electronic card server 102, the electronic card server 102 invites the potential signers at the signer clients 108 to sign the electronic card. In this regard, the electronic card server 102 notifies the potential signers via the signer clients 108 that they are invited to sign the electronic card. Those of the signers that desire to sign the electronic card, can interact with the electronic card server 102 so that they can each provide a signature and potentially a message to be provided on the electronic card.

Eventually, the electronic card server 102 has received an adequate number of signers or the time period for signing the electronic card has expired. At this point, the electronic card can be finalized. Once the electronic card has been finalized, the electronic card server 102 can cause the electronic card to be delivered to the particular recipient at the recipient client 110. Here, the electronic card is delivered electronically to the particular recipient via the recipient client 110. Alternatively or additionally, the electronic card can be produced in a print form and physically delivered to the particular recipient. In such an environment, the electronic card system 100 can further include a print system 114 that can coupled to the network 104. The print system 114 can receive the finalized electronic card from the electronic card server 102 and can produce a printed version which is then physically delivered to the recipient. For example, the physical delivery can be by postal mail or courier.

When the signers at the signer clients 108 receive an invitation to sign the electronic card from the electronic card server 102, the signers are given the opportunity to sign the electronic card. In addition, the signers can participate in a group gift or an individual gift. In one example, the gift is a donation to a charitable organization. The commerce server 112 can facilitate electronic commerce in association with the electronic card. In this regard, the signers can interact with the electronic card server 102 and/or the commerce server 112 to provide electronic purchase of an individual gift or a contribution to a group gift.

Also it should be noted that the initiator client 106 and the signer clients 108 can be implemented by personal computers operating a network browser application. As such, electronic cards can be sent by the electronic card system 100 without the need for any special purpose hardware or software at the client side.

Figure 2A:
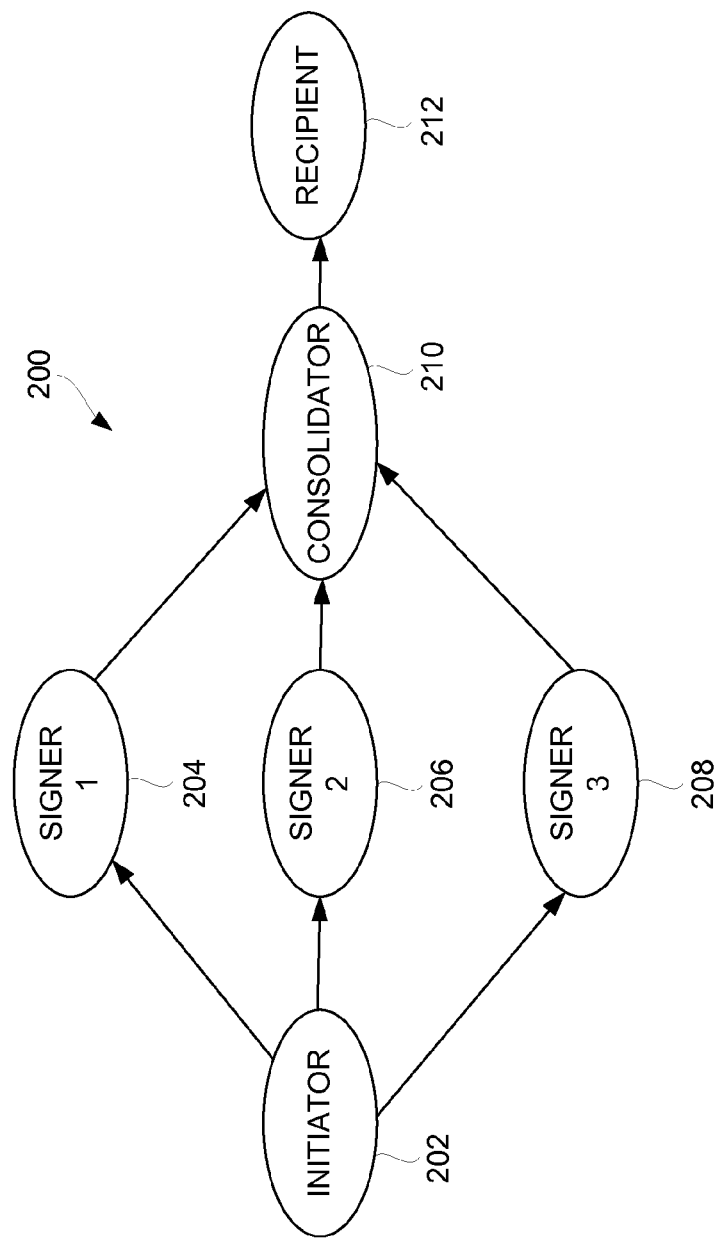
FIG. 2A is a diagram of an electronic message system according to one embodiment of the invention.
Figure 2B:
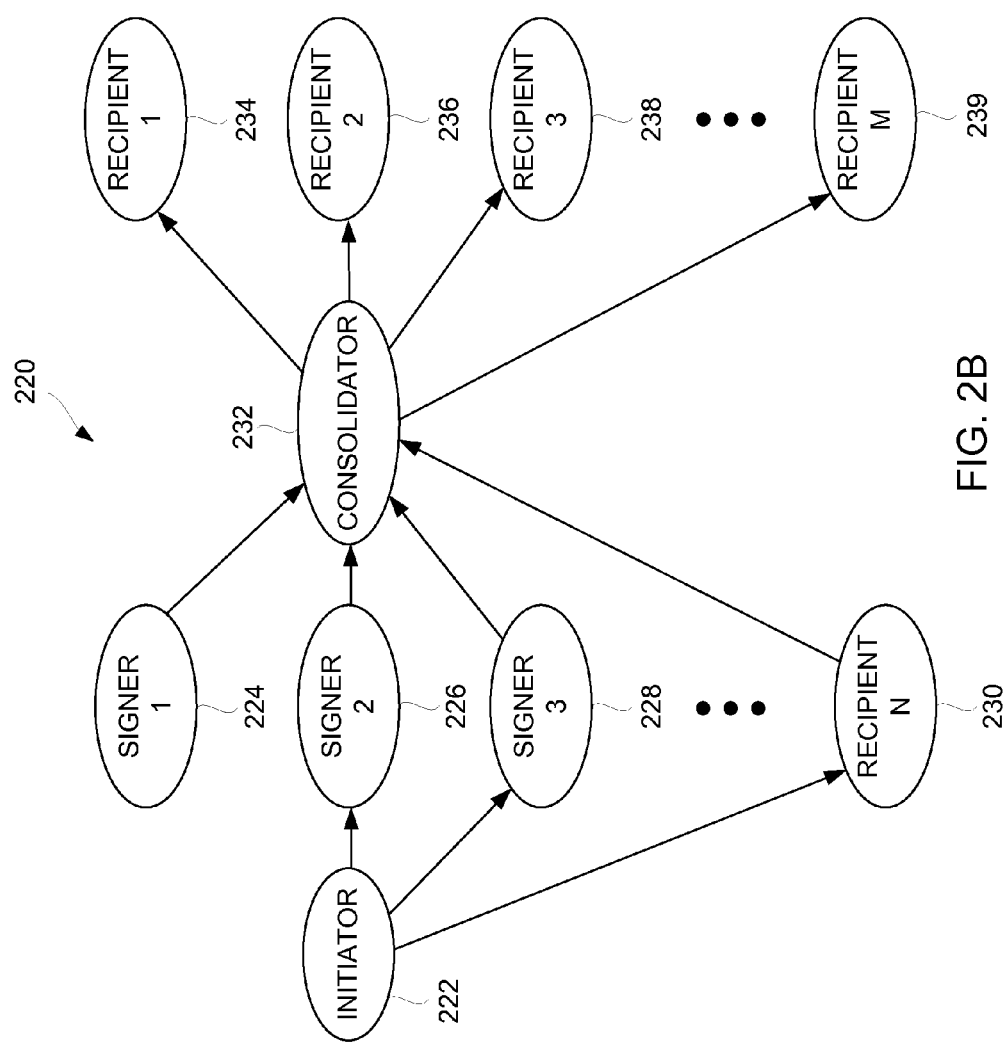
FIG. 2B is a diagram of an electronic message system according to another embodiment of the invention.
Figure 2C:
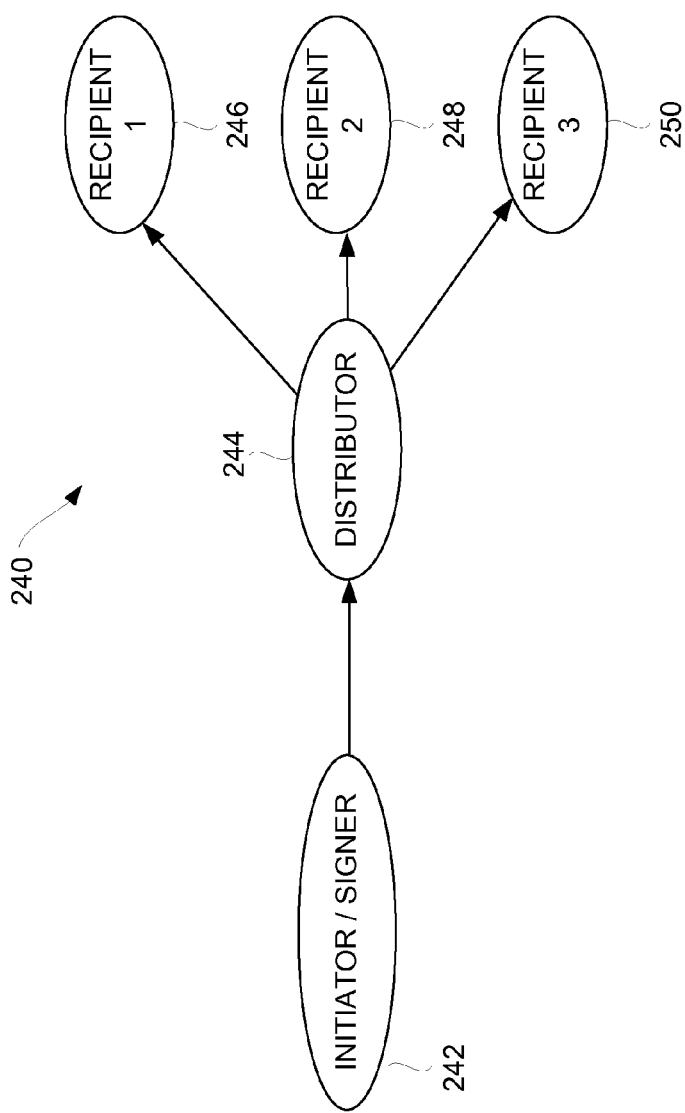
FIG. 2C is a diagram on an electronic message system according to still another embodiment of the invention.

One aspect of the invention pertains to providing an electronic group message (e.g., electronic card) from a group of signers to one or more recipients, or to providing an electronic group message from a signer to a plurality of recipients. A server computer, such as the electronic card server 102 illustrated in FIG. 1, manages the creation, completion and delivery of the electronic group messages. FIGS. 2A-2C illustrate different configurations for creating, completing and delivering electronic group messages using an electronic message system.

FIG. 2A is a diagram of an electronic message system 200 according to one embodiment of the invention. The electronic message system 200 illustrates the creation, completion and delivery of an electronic group message according to one embodiment of the invention. The electronic message system 200 operates to permit an initiator 202 to specify a base message and a plurality of signers 204-208 for a group message. Those of the signers 204-208 that participate have their individual messages provided to a consolidator 210. The consolidator 210 can consolidate the individual messages from the signers 204-208 together with any base message provided by the initiator 202. The result of the consolidation by the consolidator 210 is an electronic group message. The consolidator 210 can then forward the electronic group message to a recipient 212.

FIG. 2B is a diagram of an electronic message system 220 according to another embodiment of the invention. The electronic message system 220 illustrates the creation, completion and delivery of an electronic group message according to another embodiment of the invention. In this embodiment, an electronic group message is initiated by an initiator 222. The electronic group message that has been initiated is directed to a plurality of signers 224, 226, 228 and 230. Each of the signers 224-230 can opt to provide a signature and/or an individual message for the electronic group message. To the extent that these signers 224-230 participate, their signatures and/or individual messages are forwarded to a consolidator 232. The consolidator 232 forms the electronic group message such that it includes any base message provided by the initiator 222 together with the signatures and/or individual messages provided by the signers 224-230. The resulting electronic group message is then transmitted to a plurality of recipients, namely, recipients 234-239.

FIG. 2C is a diagram on an electronic message system 240 according to still another embodiment of the invention. An initiator or signer 242 creates an electronic group message for distribution. After the electronic group message is created, the electronic group message is provided to a distributor 244. The distributor 244 then transmits the electronic group message to a plurality of recipients 246-250. In one implementation, the electronic message provided to each of the recipients 248-250 is the same. In another implementation, some or all of the recipients 246-250 can receive different electronic messages. For example, the initiator or signer 242 can create the electronic group message such that different electronic messages are provided to each of certain of the recipients 246-250. For example, the initiator or signer 242 can create the electronic group message such that certain portions are private to certain of the recipients 246-250.

Although FIGS. 2A-2C illustrate different configurations for creating, completing and delivering electronic group messages to recipients using an electronic message system, in one embodiment the recipients can return electronic messages to the initiator or one or more of the signers, in either a group or individual format.

Figure 3:
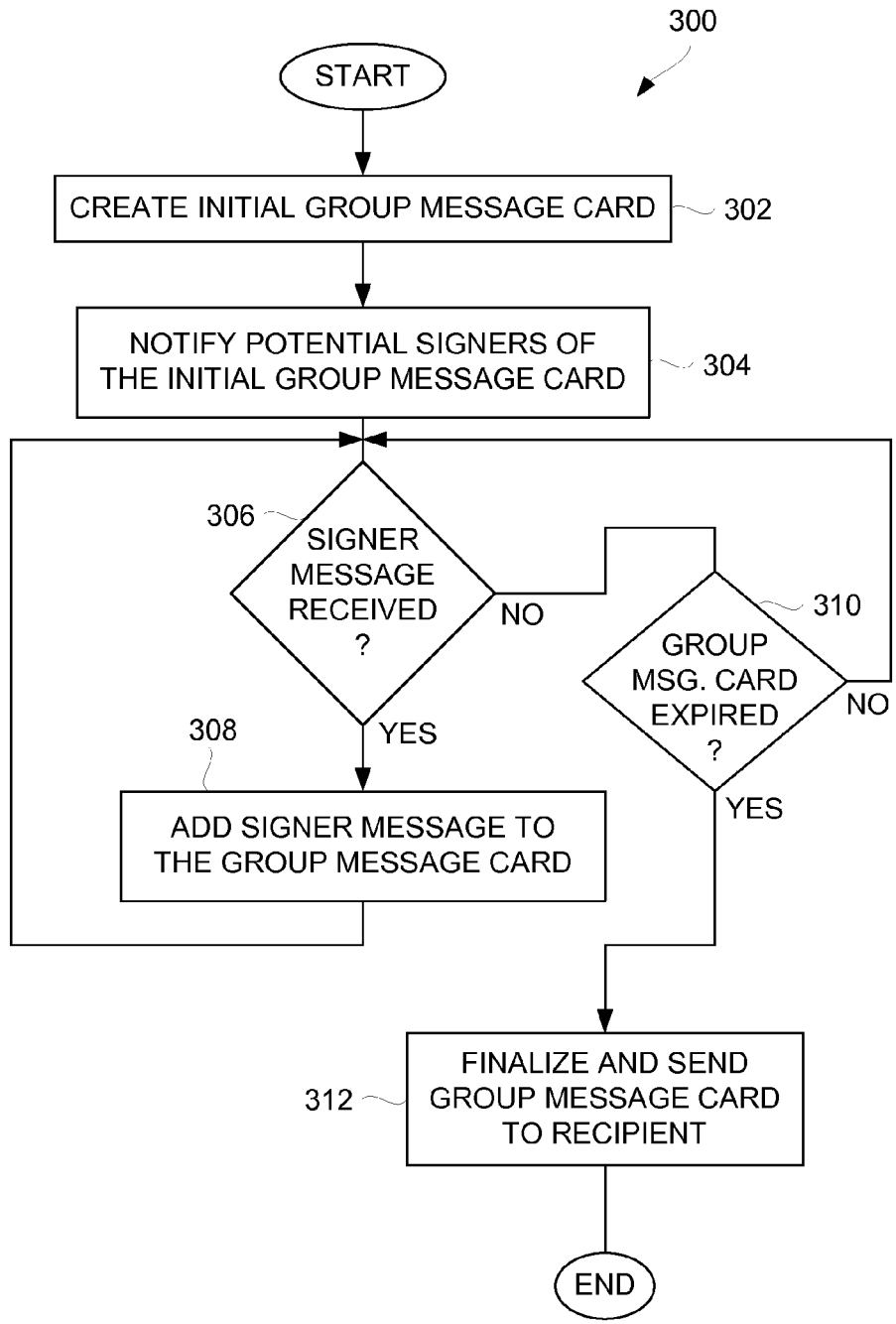
FIG. 3 is a flow diagram of a group card delivery process according to one embodiment of the invention.

FIG. 3 is a flow diagram of a group card delivery process 300 according to one embodiment of the invention. The group card delivery process 300 is, for example, performed by a server, such as the electronic card server 102 illustrated in FIG. 1.

The group card delivery process 300 creates 302 an initial group message card. Potential signers of the initial group message card are then notified 304. The notification to the potential signers can inform the potential signers that they can not only easily sign the initial group message card but also provide thereon an individual signer message and/or provide a gift. The gift can be either individual gift or a contribution to a group gift.

After the potential signers have been notified 304, a decision 306 determines a whether a signer message has been received. When the decision 306 determines that a signer message has been received, the signer message is added 308 to the group message card. After the signer message has been added to the group message card, the group card delivery process 300 can return to repeat the decision 306 so that additional signer messages from other potential signers can be received and added 308 to the group message card.

Alternatively, when the decision 306 determines that a signer message has not been received, a decision 310 determines whether the group message card has expired. In other words, the group message card can be deemed to be expired when an allocated duration of time or an administrator action indicates that the group message card should now be delivered to the recipient. Hence, as shown in FIG. 3, when the decision 310 determines that the group message card has not yet expired, the group card delivery process 300 returns to repeat the decision 306 and subsequent operations such that received signer messages can be added 308 to the group message card. On the other hand, when the decision 310 determines that the group message card has expired, the group message card is finalized and sent 312 to the recipient. After the finalized group message card has been sent 312 to the recipient, the group card delivery process 300 is complete and ends.

Although group card delivery process 300 is primarily concerned with adding signer messages to a group message card, it should be noted that potential signers may simply just sign the group message card. In one example, signing the group message card can denote simply adding one's name to the group message card. In one implementation, the signer can authorize the server to add the signer's name to the group message card. In the event that a signer's signature is to be added to the group message card, it can be performed in a variety of ways. In one embodiment, the block 312 can add the signatures, e.g., names of those of the signers that participate, by placing their signature and/or message on the card. In another embodiment, signer messages can be presumed to include signatures; hence, a received signer message with no message content can be considered a signature of a signer or an authorization to use the signature of the signer. The signature being placed on the card can be represented as a printed name for the signer or as an image representing the signer's actual signature.

The group message card can be sent 312 to the recipient in a variety of different ways. In one implementation, the group message card can be delivered electronically to the recipient. For example, the group message card can be sent to the recipient as an electronic message (email). In another implementation, the group message card can be produced in a print form and physically delivered to the recipient. In the case where the group message card is to be delivered to multiple recipients, the group message card, whether the same or different, can be delivered to the multiple recipients using the same or different delivery means.

Figure 4:
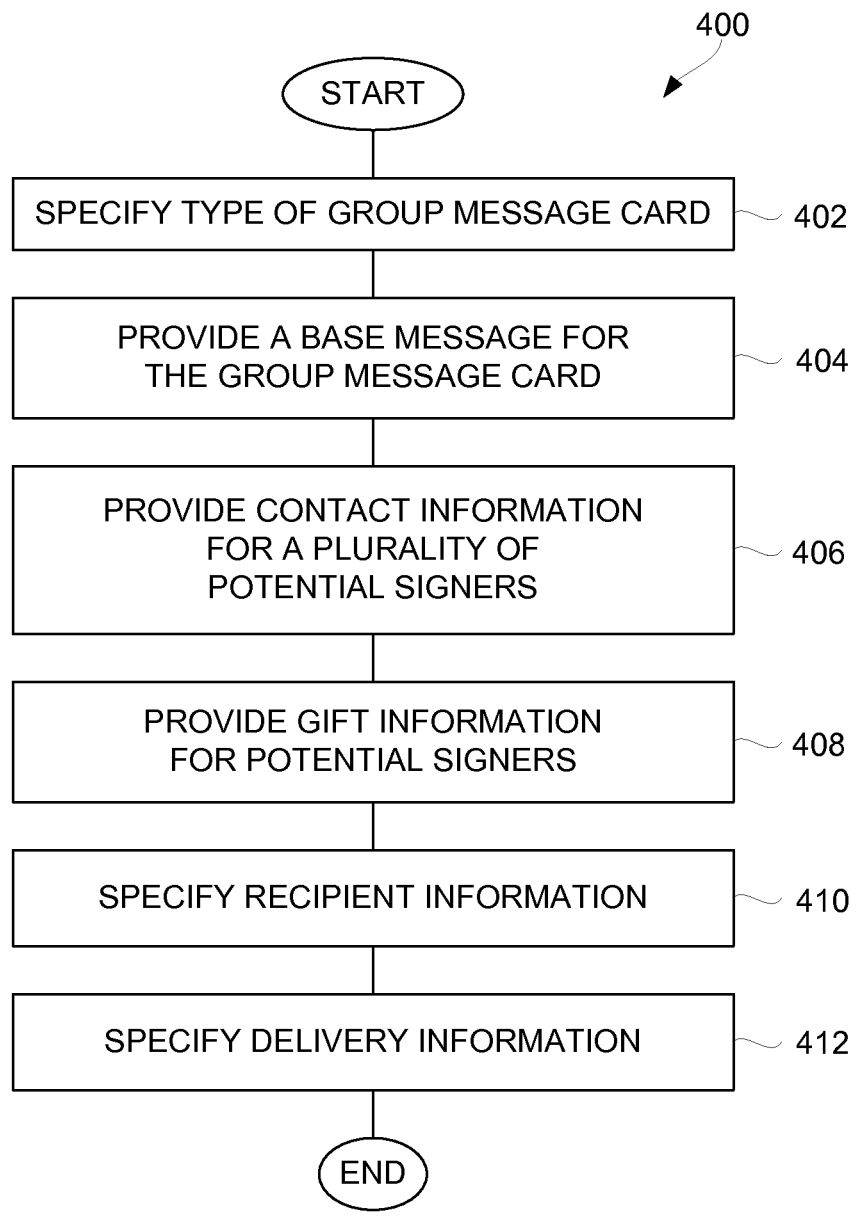
FIG. 4 is a flow diagram of a group message card creation process according to one embodiment of the invention.

FIG. 4 is a flow diagram of a group message card creation process 400 according to one embodiment of the invention. The group message card creation process 400 can, for example, represent processing that can be performed by the block 302 of FIG. 3. The group message card creation process 400 serves to create a group message card. In one embodiment, the group message card is a care card.

The group message card creation process 400 initially specifies 402 a type of group message card. Examples of types of group message cards include a welcome card, anniversary card, birthday card, retirement card, goodbye card, sympathy card, get well card, thank you card, etc. Next, a base message for the group message card is provided 404. Typically, an initiator of the group message card can provide the base message. For example, an initiator of the group message card can enter the base message or select one of a plurality of predetermined base messages. In one implementation, the predetermined base messages for the group message card can be dependent on the type of group message card. Contact information for a plurality of potential signers can also provided 406. The contact information can be used to determine how to contact the potential signers. For example, the contact information can include an electronic mail address for each of the potential signers. In addition, if desired, gift information for potential signers can be provided 408. The gift information can assist potential signers with purchasing or contributing to a gift. Recipient information for the recipient is also to be specified 410. The recipient information can be used to determine how to contact the recipient. For example, the recipient information can include an electronic mail address. Still further, delivery information for the group message card and/or gift can be specified 412. For example, the delivery information can specify when, where and/or how the group message card and/or gift is to be delivered to the recipient.

Figure 5A:
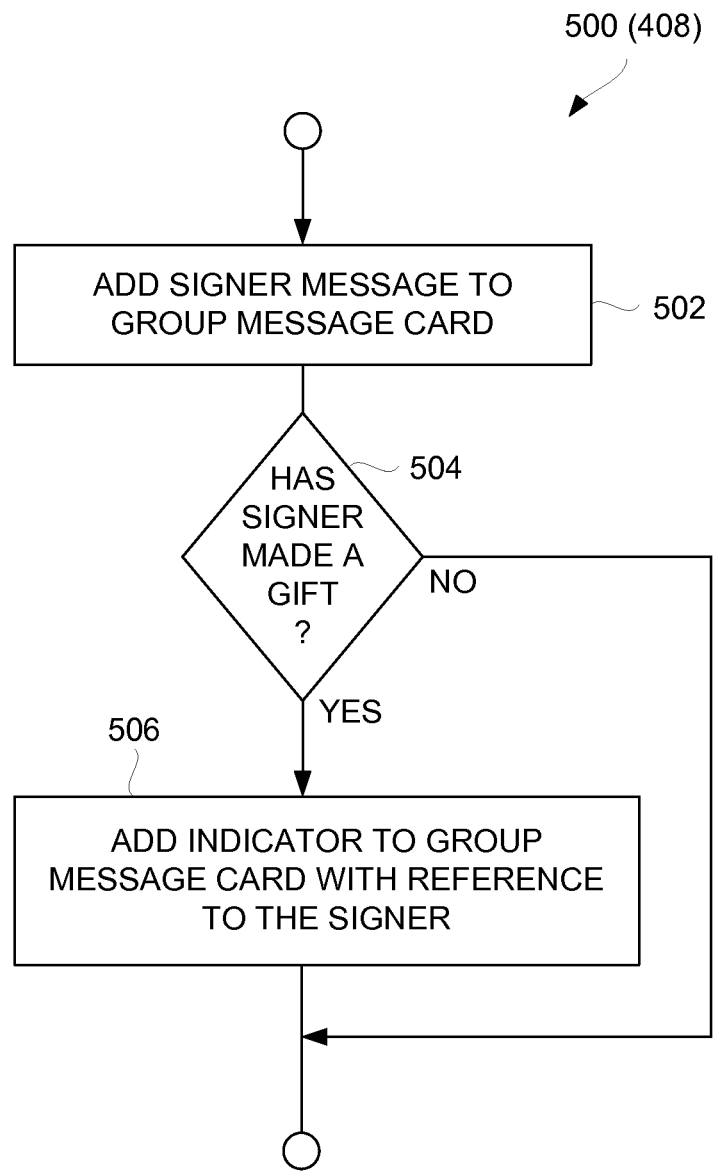
FIG. 5A is a flow diagram of a separate gift purchase process according to one embodiment of the invention.

FIG. 5A is a flow diagram of a separate gift purchase process 500 according to one embodiment of the invention. The separate gift purchase process 500 described in FIG. 5A can represent a replacement to the block 308 illustrated in FIG. 3. According to the separate gift purchase process 500, a signer message is added 502 to the group message card. Here, it is assumed that a signer message has been received; hence, the signer's message would be added 502 to the group message card. A decision 504 then determines whether the signer has made a gift. When the decision 504 determines that the signer has made a gift, an indicator (e.g., gift indicator) can be added 506 to the group message card with reference to the signer. The indicator provided on the group message card can be provided in various ways. For example, the indication can be a text or graphic provided proximate the signer's message or signature. As another example, the group message card can include a list of signers that have or are providing a gift. Following the operation 506, or its being bypassed when the signer has not made a gift, the separate gift purchase process 500 ends and processing returns to repeat the decision 306 illustrated in FIG. 3.

Figure 5B:
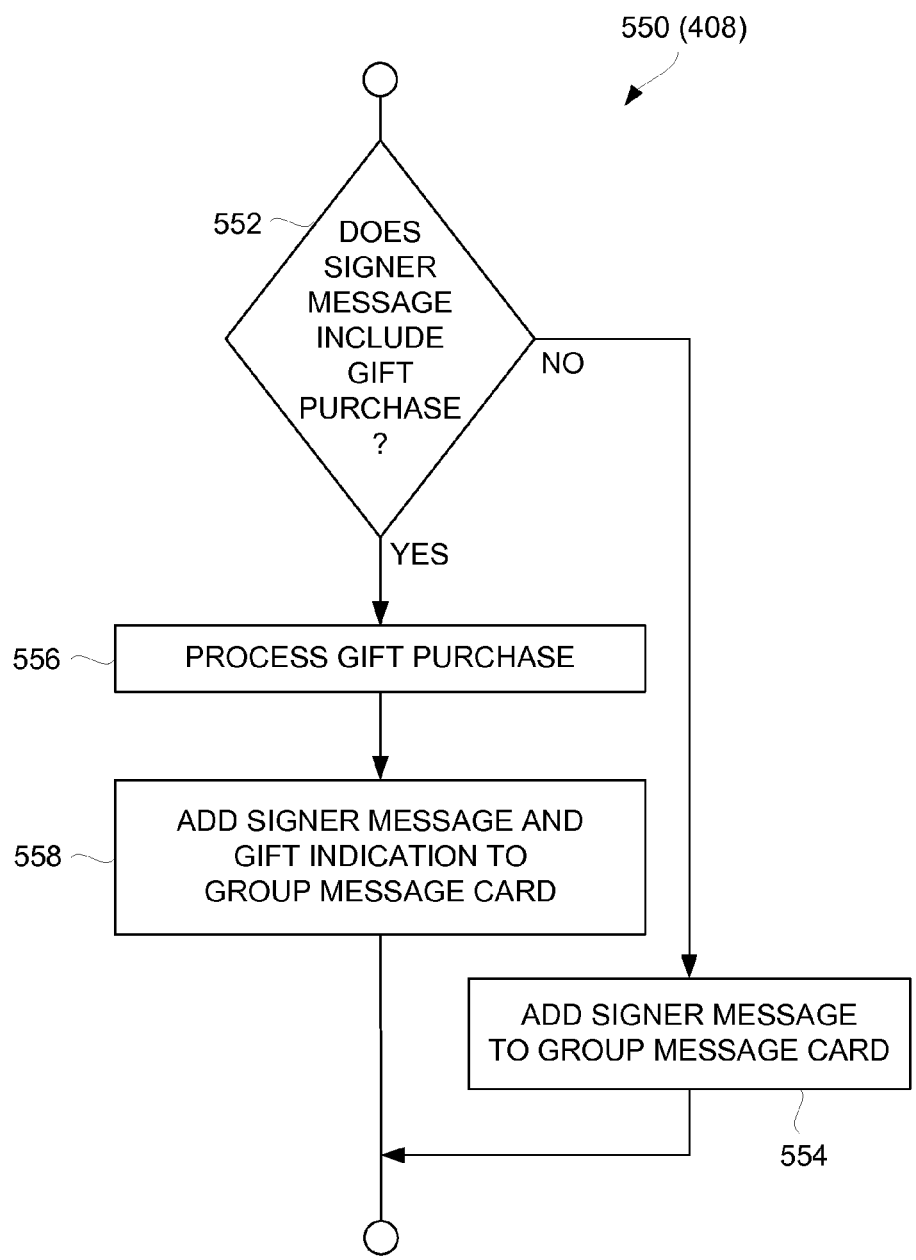
FIG. 5B is a flow diagram of an embedded gift purchase process according to one embodiment of the invention.

FIG. 5B is a flow diagram of an embedded gift purchase process 550 according to one embodiment of the invention. The embedded gift purchase process 550 is described in FIG. 5B can represent a replacement to the block 308 illustrated in FIG. 3. The embedded gift purchase process 550 begins with a decision 552. The decision 552 determines whether a signer message includes a gift purchase. The signer message can be deemed to include a gift purchase when the signer has selected to purchase or contribute to a gift in response to the notification to the potential signers of the initial group message card, or when the signer otherwise indicates with the signer message that they will be providing a gift. When the decision 552 determines that the signer message does not include a gift purchase, then a signer message is added 554 to the group message card. Alternatively, when the decision 552 determines that the signer message does include a gift purchase, then the gift purchase is processed 556. For example, the processing of the gift purchase can electronically process payment for the gift (and possibly schedule its delivery). Then, a signer message and a gift indication are added 558 to the group message card. The gift indicator servers as an indication to a recipient of the group message card that a certain signer provided (or contributed to) a gift. The gift indicator provided on the group message card can be provided in various ways. For example, the gift indication can be a text or graphic provided proximate the signer's signature. As another example, the group message card can include a list of signers that have (or are) providing a gift. Following the blocks 554 and 558, the embedded gift purchase process 550 is complete and ends.

The separate gift purchase process 500 illustrated in FIG. 5A and the embedded gift purchase process illustrated in FIG. 5B can be use separately or in combination to enhance the group card delivery process 300 illustrated in FIG. 3.

Figure 6:
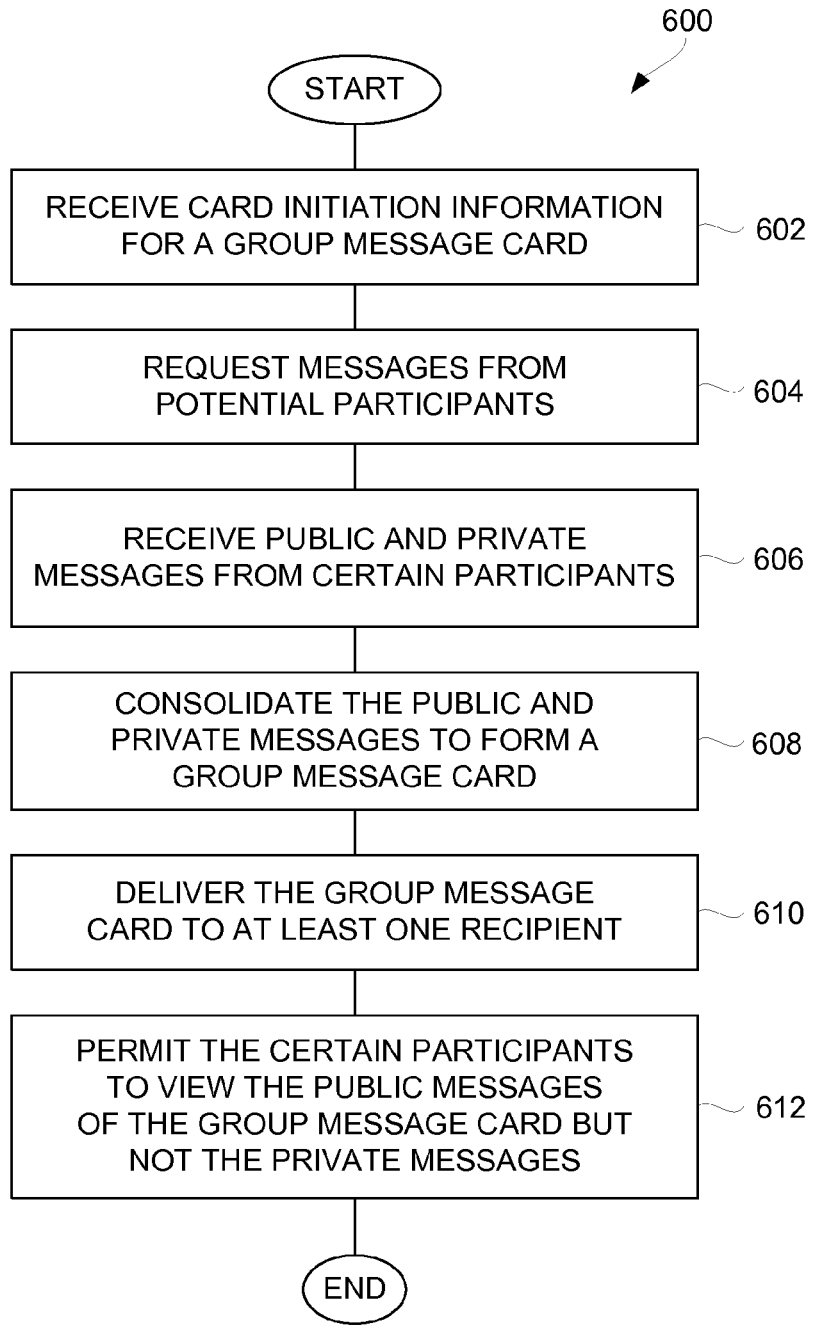
FIG. 6 is a flow diagram of a group message delivery process according to another embodiment of the invention.

FIG. 6 is a flow diagram of a group message delivery process 600 according to another embodiment of the invention. The group message delivery process 600 is, for example, performed by a server, such as the electronic card server 102 illustrated in FIG. 1.

The group message delivery process 600 receives 602 card initiation information for a group message card. The card initiation information is typically provided by an initiator operating an initiator client. In one implementation, the card initiation information includes at least recipient information, card selection information, participant information and a base message.

Next, messages are requested 604 from potential participants. Here, each of the potential participants can be provided with a request for a message that can be added to the group message card. In response to the request, the potential participants can provide messages that are to be added to the group message card. These messages can be private messages or public messages. A private message are is private between a particular participant and a recipient. Public messages are publicly provided with the group message card such that any of the participants as well as the recipient can view such public messages. Next, public and private messages are received 606 from certain participants that desire to participate in the group message card.

Thereafter, the public and private messages are consolidated 608 to form a group message card. The group message card is then delivered 610 to at least one recipient. The group message card includes the various private and public messages from the certain participants. The group message card might also include a base message dependent on the type of the group message card, gift information (e.g., gift indications), etc. The characteristics of the group message card are such that the certain participants are permitted 612 to view the public messages of the group message card but not the private messages. However, the private messages are not generally accessible by the participants. However, if a particular participant has provided a private message to the group message card, that participant, as well as the at least one recipient, could be permitted 612 to view the associated private message. Following the block 612, the group message delivery process 600 is complete and ends.

Another aspect of the invention is the ability for the one or more recipients of a group message card (e.g., electronic care card) to return messages, private or public, back to one or more of the participants. For example, a return message from a recipient can provide (i) a public message to all the participants, (ii) at least one private message for one or a subset of the participants, or (iii) both.

Another aspect of the invention is that an entity can utilize electronic group messages (e.g., electronic care cards) to supports its employees, friends, and organizations. In one embodiment, the initiator is any representative of an entity that is providing the group message card to a recipient. For example, the representative of the entity might be a human resources person. As another example, the representative of the entity might be a owner, manager or executive of the entity.

Figure 7:
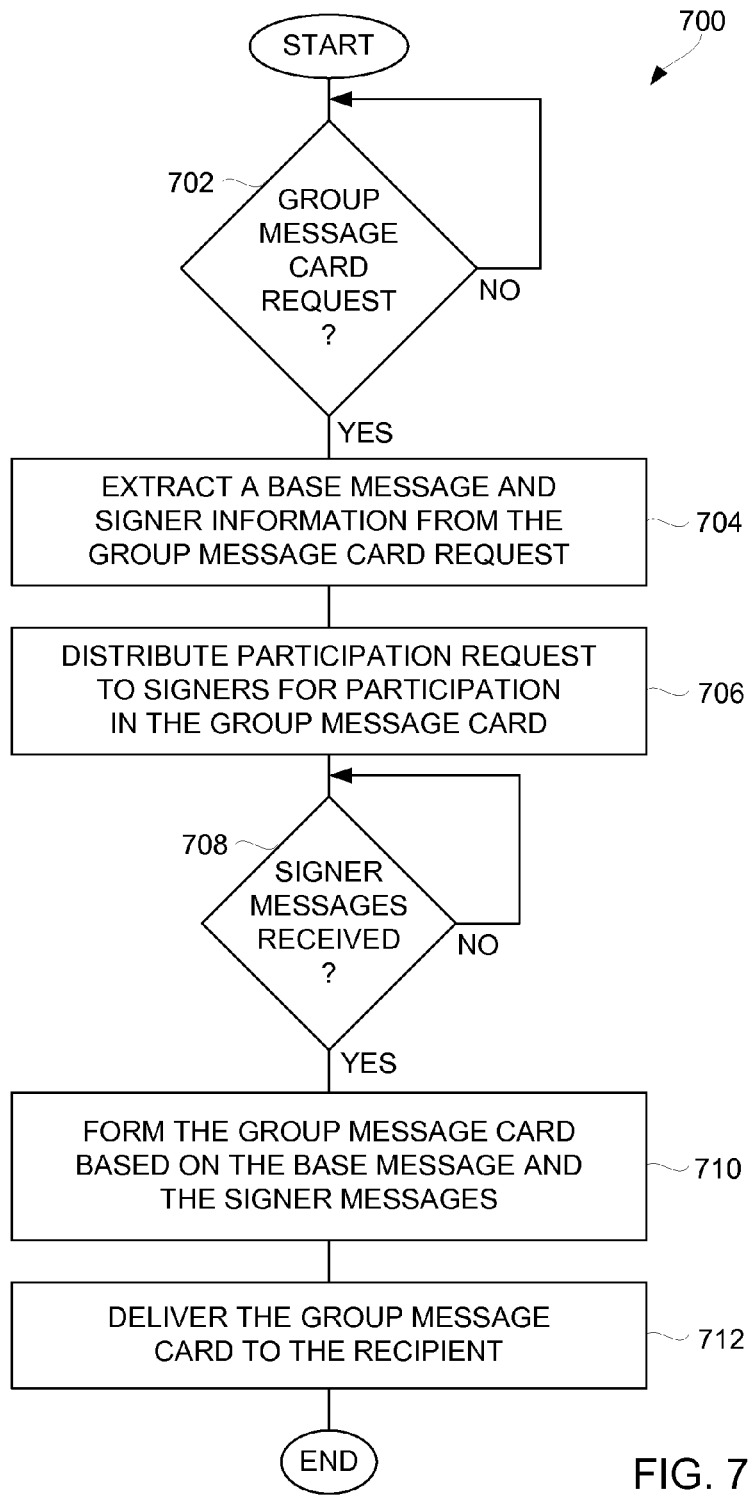
FIG. 7 is a flow diagram on a group message delivery process according to still another embodiment of the invention.

FIG. 7 is a flow diagram on a group message delivery process 700 according to still another embodiment of the invention. The group message delivery process 700 is, for example, performed by a server, such as the electronic card server 102 illustrated in FIG. 1.

The group message delivery process 700 begins with a decision 702. The decision 702 determines whether a group message card request has been received. Typically, a group message card request would be provided to the server by an initiator. In one embodiment, the initiator is any representative of an entity that is providing the group message card to a recipient. For example, a company might providing "get well" card from a plurality of coworkers to a recipient coworker that has a health issue. When the decision 702 determines that a group message card request has not been received, the group message delivery process 700 awaits such a request.

Once the decision 702 determines that a group message card request has been received, a base message and signer information are extracted 704 from the group message card request. Typically, the base message and the signer information would be provided in the group message card request by the initiator. Next, a participation request is distributed 706 to signers for participation in the group message card. The participation request invites the signers to participate in the group message card by signing the card, providing a message and/or providing or contributing to a gift.

Next, a decision 708 determines whether signer messages have been received. In one embodiment, the signer messages can be public or private messages to be provided with the group message card. When the decision 708 determines that signer messages have not been received, then the group message delivery process 700 awaits such messages. Here, the process 700 could wait for a predetermined period of time or could wait until an adequate number of signer messages have been received before finalizing the group message card.

In any case, once the decision 708 determines that signer messages have been received, the group message card is formed 710 based on the base message and the signer messages. Thereafter, the group message card is delivered 712 to the recipient. After the group message card is delivered 712, the group message delivery process 700 ends.

As noted above, the recipient can be a co-worker that has a health condition. In such case, the company employing the workers can sponsor the group message card. For example, a human resource representative from the company can be the initiator, the potential participants can be coworkers of the recipient, and the recipient can be a co-worker having a health condition.

The electronic group message can also be initiated by an employee who desires to send an electronic group message (e.g., electronic petition or lobby) to a plurality of other employees of the entity.

Figure 8:
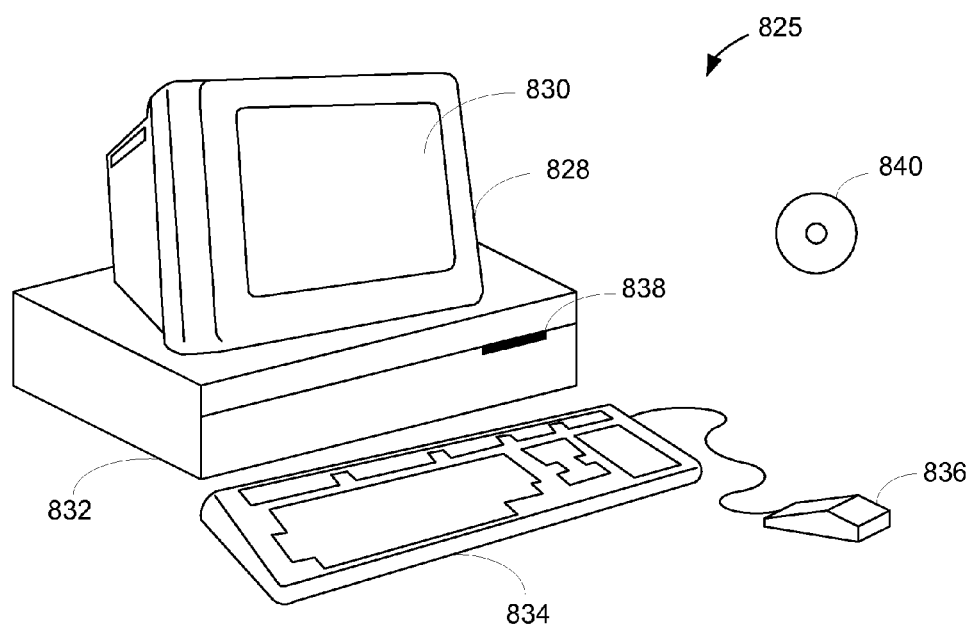
FIG. 8 shows an exemplary computer system suitable for use with the invention.

FIG. 8 shows an exemplary computer system 825 suitable for use with the invention. Computer system 825 includes a display monitor 828 having a single or multi-screen display 830 (or multiple displays), cabinet 832, keyboard 834, and mouse 836. Cabinet 832 houses a drive 838, such as a CD-ROM or floppy drive, system memory and a hard drive (not shown) which may be utilized to store and retrieve software programs incorporating computer code that implements the present invention, data for use with the invention, and the like. Although CD-ROM 840 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, a computer program for the computer system 825 is provided in the system memory, the hard drive, the CD-ROM 840 or other computer readable storage medium and serves to implement, or assist in the implementation of, the invention.

As noted above, in one embodiment, a group message card is a care card. Some exemplary uses for the card cards are described below. However, these exemplary uses are not an exclusive list, and each exemplary use can include the donation/gift option described above, as well as the personal message capability for its recipient.

A business entity, such as a corporation, can use a "Corporate Care Card" as a means to send an electronic card to an employee (or their family member) in any number of events, including but not limited to: death, illness/injury, hospitalization, anniversary, birthday, baby shower, or retirement. The electronic card would be distributed electronically to the other employees in the business entity (or subdivision thereof) or other selected group (collectively, the participants). The participants could electronically sign the card and include a private message, including various private attachments (e.g., picture, recorded message). The electronic card could be forwarded to other participants or returned to the sender.

For example, if an employee dies, the HR department can circulate the Corporate Care Card for employees to write a private message to the departed employee's family member. They can also select to donate to the employee's selected charity or to the funeral proceedings. Another use of the Corporate Care Card may include a group electronic message to employees (or other recipients) that contains an attachment, with a region (e.g., field or box) for a personal message/attachment to select recipients and a similar personal message box for the recipients to reply.

A group electronic message can also be used to facilitate political action. An electronic communication by a single sender (or multiple senders with personal messages) to politicians or lobbyists, including, if applicable, an attached document, with the ability of the recipient to reply to the sender (or selected senders) with personal messages, and ability of the sender(s) to make a political contribution and evidence thereon in the communication.

A group electronic message can also be used in the context of a fan club. An electronic card to the members of the fan club to sign and include their personal message for the recipient, with the ability of the recipient to reply with personal messages to select members.

A group electronic message can be used by individuals. A group of individuals who want to send a single electronic card/invitation can include their private messages and once the personal messages (and gift item or donation) are made, the electronic card can be sent to the recipient, with the options as described above.

A group electronic message can also be used by a funeral home. The funeral home can send the electronic card on behalf of the family. The electronic card can include a notice of the proceedings and the elegy, and indicate the charity selected for donations in honor of the decedent (with a link to a florist or selected charity). The electronic card can be sent to family members (and forwarded by such recipients to other recipients), all of which can respond with a personal note to the family (and donation).

A group electronic message can also be used by a church. The church can send an electronic card to its constituents in the event of (1) a fundraising event or goal or other church related activity, or (2) a member's illness or death (or any other event). The electronic card can advertise an event or activity and facilitate members in making a donation/gift. For example, for those members that missed the weekly sermon, the church would send a summary of the lesson with an individual blessing, including a link (e.g., hyperlink) to make an offering. For members in need, the church can send a care card that includes private messages from its constituents and/or the minister.

A group electronic message can also be used by a charity. The charity can send an electronic card to its constituents in the event of a fundraising event or goal or other charity related activity. Constituents can use the electronic card to send/receive personal messages and/or make donations. A charity might also participate in sponsoring or advertising on electronic cards so as to advertise their charity and/or seek donations and/or sales of its charitable products. Sponsorship or advertising can include a trademark, logo, etc. for a charity on the electronic card.

A group electronic message can also be used by the military. The military can use the electronic card for a member of the armed services that is injured or killed. For example, in the event of death of a soldier, the care card can include the eulogy and funeral/burial arrangements. It can also include a summary of his or her service and achievements. The care card could also be sent to the soldier's unit (e.g., platoon) for receiving personal message to be provided with the care card for the family.

A group electronic message can also be used by an educational facility/institution. For example, the care card can be used as part of the annual yearbook, where public and/or private message can be provided that become part of the electronic version of the yearbook. As another example, a group electronic message can be used by a group of students to send a group thank you to a teacher.

Note when a gift is provided, a participant purchases a gift individually or contributes to a group gift. The type of gift can vary widely. Some examples of gifts include: gift cards, pre-paid credit or debit cards, charitable donations, insurance, consumer goods, flowers, food, etc. The gift is provided to a recipient. The gift being provided to the recipient can be directly for the recipient or indirectly for the recipient. For example, if the gift is a donation on behalf of the recipient, the gift is indirectly provided to the recipient.

To the extent the gift can be electronically provided to the recipient, the recipient can get the gift with the electronic group message (e.g., electronic care card). However, when the gift is not electronically deliverable, the recipient can get a notification or other information pertaining to the gift. For example, the notification or other information can inform the recipient of what the gift is and how and when the gift is to be delivered or otherwise made available to the recipient.

Still further, in another aspect of the invention, an initiator or other user of the system can arrange for or configure the system to provide subsequent group messages or reminders therefor. As one example, on an anniversary date or other pre-arranged date, the system can be configured to send another group message (even the same group message as previously sent) to a recipient. Alternatively, the system can remind (e.g., via email) the user to send another message to the recipient of the earlier group message. Such a reminder can be provided on the anniversary date of the earlier group message or other pre-arranged date. The system can assist the user in creating and sending the another message, such as through enabling the user to use the content from the earlier message or enabling the user to provide new content for the another message. As another example, a user can configure the system to send messages at predetermined times in the future. Each of these messages can be different. The message content can be formed for one or more of the messages in advance. Any of these messages can contain private and/or public messages or other aspects as discussed above.

In any of the above-mentioned embodiment, any of the messages can be screened for improper content, such as offensive language. To the extent offensive language is found, the message can be declined, deleted or altered.

Additionally, if desired, signers can be required to provide identifying information before their signature/message is accepted. The identifying information can be used to authenticate the signers. The identifying information can take many different forms, including PIN number, employee number, social security number, phone number, address, etc. The signers can also be required to register with the system (e.g., a system website) in order to participate in the group message.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for providing a card to a recipient, said method comprising:
    initiating an electronic card destined for a recipient; identifying a plurality of potential signers of the electronic card; notifying each of the potential signers of the electronic card;
    receiving personal messages for the electronic card from a plurality of the potential signers;
    determining, by a computing device, whether any of the plurality of the potential signers have provided a gift for the recipient;
    modifying, by the computing device, the electronic card to include the personal messages from the signers;
    providing the modified electronic card, or a printed version thereof, to the recipient; determining whether the gift, if any, being provided by one or more of the signers is a donation to one or more charitable organizations; and
    providing a donation receipt for tax deduction purposes to the signers that have made a donation if it is determined that the gift is a donation to one or more charitable organizations, the donation receipt indicating receipt of the donation by the one or more charitable organizations that have or will receive the donation,
    wherein the electronic card associated with the notifying includes or references an inducement to motivate the potential signers to contribute a gift or to become participants in a group gift, and wherein the inducement includes at least a matching contribution to the group gift.

2. A method as recited in claim 1, wherein said modifying operates to modify the electronic card to include (i) the personal messages from the signers and (ii) indicators for those of the potential signers that have been determined to have provided gifts.

3. A method as recited in claim 1, wherein the notifying comprises transmitting the electronic card to the potential signers facilitates electronic donation to the one or more charitable organizations.

4. A method as recited in claim 1, wherein the modified electronic card is not provided to the potential signers, thereby the personal messages are provided to the recipient but not to other potential signers.

5. A method as recited in claim 1, wherein the notifying comprises transmitting the electronic card to each of the potential signers facilitates not only the providing of the personal messages but also facilitates providing a gift for the recipient.

6. A method as recited in claim 1, wherein the electronic card transmitted to each of the potential signers facilitates not only the providing of the personal messages but also facilitates providing the donation to the one or more charitable organizations.

7. A method as recited in claim 1, wherein said method further comprises:
    enabling the potential signers to participate in a group charitable contribution.

8. A computer-implemented method for providing a group message card to at least one recipient, said method comprising:
    (a) receiving card initiation information for the group message card;
    (b) requesting messages from each of a plurality of participants;
    (c) receiving public messages and private messages from a set of recipients from the plurality of participants;
    (d) consolidating, by at one or more computing devices, the public messages and the private messages from the set of participants to form a group message card;
    (e) sending, by the one or more computing devices, the group message card to the at least one recipient, the group message card sent to the at least one recipient includes the public messages and the private messages;
    (f) permitting the set of participants to view the public messages of the group message card but not the private messages of at least the other of the participants; and
    (g) enabling the at least one recipient to return messages to each of the participants in the set of participants, wherein the group electronic card being sent by said sending
    (e) includes or references an inducement to motivate the at least one recipient to contribute a gift or to become participants in a group gift, and wherein the inducement includes at least a matching contribution to the group gift.

9. A method as recited in claim 8,
    wherein the group message card is associated with an entity, and the plurality of participants are affiliated with the entity, and
    wherein the card initiation information comprises recipient information, card selection information, participant information and a base message.

10. A method as recited in claim 8, wherein the at least one return message includes a public message to all the participants in the set of participants and at least one private message to one of the participants in the set of participants.

11. A method as recited in claim 8, wherein the at least one return message includes at least one private message to one or a subset of the participants in the set of participants.

12. A server machine for providing an electronic card to a recipient, said server machine comprising: a memory for storing at least computer program code; and
    a processor configured to execute the computer program code stored in said memory,
    wherein the computer program code stored in said memory includes at least: computer program code for initiating an electronic card destined for a recipient;
    computer program code for identifying a plurality of potential signers of the electronic card; computer program code for notifying each of the potential signers of the electronic card; computer program code for receiving personal messages for the electronic card from a plurality of the potential signers;

computer program code for determining whether any of the plurality of the potential signers have provided a gift for the recipient; computer program code for modifying the electronic card to include the personal messages from the signers;

computer program code for providing the modified electronic card, or a printed version thereof, to the recipient, wherein computer program code for notifying each of the potential signers of the electronic card includes or references an inducement to motivate the potential signers to contribute a gift or to become participants in a group gift, and wherein the inducement includes at least a matching contribution to the group gift.

13. A server machine as recited in claim 12, wherein the electronic card is sponsored by an entity.

14. A server machine as recited in claim 12, wherein computer program code for notifying each of the potential signers of the electronic card includes or references a group gift that the potential signers are able to contribute to.

15. A server machine as recited in claim 14, wherein the computer program code stored in said memory includes at least:

computer program, code for determining whether the gift, if any, being provided by one or more of the signers is a donation to one or more charitable organizations; and computer program code for facilitating providing of a donation receipt for tax deduction purposes to the signers that have made a donation if it is determined that the gift is a donation to one or more charitable organizations, the donation receipt indicating receipt of the donation by the one or more charitable organizations that have or will receive the donation.

16. A server machine as recited in claim 14, wherein computer program code for notifying each of the potential signers of the electronic card includes or references an inducement to motivate the potential signers to become signers.

17. A server machine as recited in claim 14, wherein the group gift includes a donation to one or more charitable organizations.

18. A server machine as recited in claim 12, wherein the computer program code stored in said memory includes at least computer program code for facilitating a matching contribution to the donation if the gift is a donation to one or more charitable organizations.

19. A method as recited in claim 1, wherein the providing of the donation receipt comprises electronically sending the donation receipt.

20. A method as recited in claim 1, wherein if the gift being provided by one or more of the signers is a donation, the method further comprises providing a matching contribution to the donation.

* * * * *